Sept. 4, 1945.　　　　　J. F. MELICHAR　　　　　2,383,983
VALVE ASSEMBLY
Filed June 9, 1944　　　　　2 Sheets-Sheet 1

Inventor
Joseph F. Melichar

By
Mason, Porter & Diller
Attorneys

Sept. 4, 1945.  J. F. MELICHAR  2,383,983
VALVE ASSEMBLY
Filed June 9, 1944  2 Sheets-Sheet 2
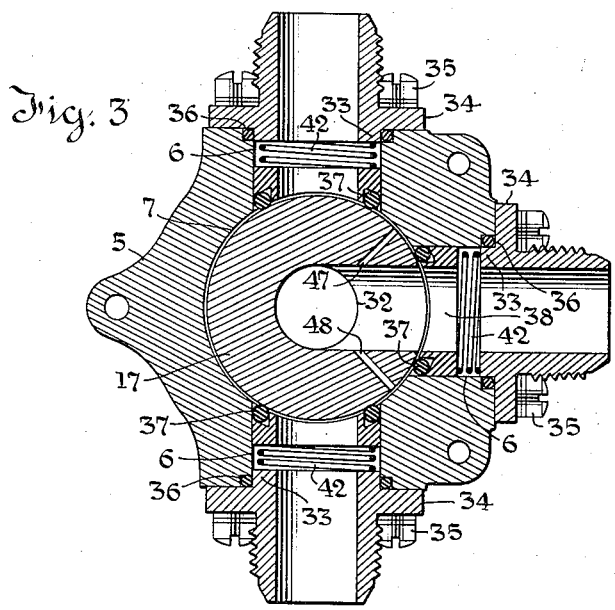
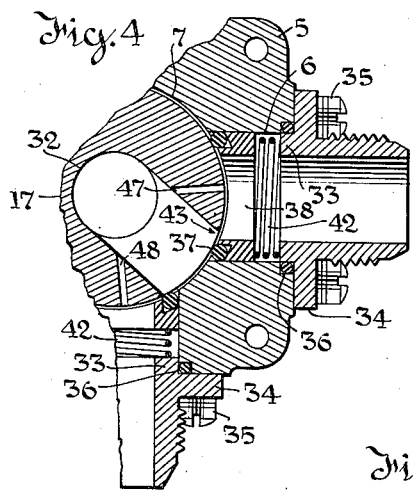
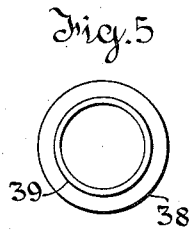
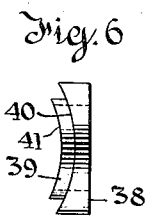
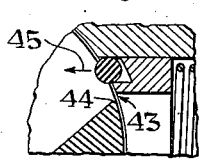
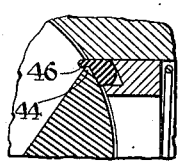
Inventor
Joseph F. Melichar
By
Mason, Porter & Diller
Attorneys Patented Sept. 4, 1945

2,383,983

UNITED STATES PATENT OFFICE

2,383,983
VALVE ASSEMBLY

Joseph F. Melichar, Cleveland, Ohio, assignor to The Parker Appliance Company, Cleveland, Ohio, a corporation of Ohio Application June 9, 1944, Serial No. 539,514

9 Claims. (Cl. 251—113)

The invention relates generally to valves and primarily seeks to provide a novel valve structure embodying a casing having at least one inlet port and at least one outlet port, a rotor having a flow passage therethrough and turnable for permitting or preventing flow of fluid through said ports and passage, sealing ring means carried by the casing and surrounding a port therein and yieldably engaging the rotor for sealing off the ring surrounded port when the rotor is turned so as to place the flow passage therein out of registry with said ring surrounded port, and novel means for preventing pinching of the sealing ring means between the rotor and the casing as the flow passage in the rotor is moving past said ring means.

In employment of valve structures of the character stated, examples of which are disclosed in the application for U. S. Letters Patent filed by Arthur L. Parker on April 8, 1944 and identified by Serial Number 530,172, it has been noted that there is a tendency for the sealing ring means to project from its mounting groove in the casing and become pinched between the rotor and the casing as the flow passage in the rotor moves past said ring means. This is caused in part by frictional contact between the rotor and the sealing ring means and resulting pressure of the ring means against wall portions of the mounting groove bearing such angular relation to the direction of force application as to tend to crowd the sealing means out of the mounting groove and into the passing rotor flow passage, and in part by passage of fluid at very high velocity into the rotor passage as it approaches an out-of-registry position with respect to a given casing port controlled thereby and the resulting sort of wire drawing or orificing effect tending to suck the adjacent portion of the sealing ring means out of its mounting groove and into said passing rotor flow passage. Obviously such pinching of the sealing ring means is objectionable, and this problem is subject to only partial solution by providing clearances and rounded edges at critical points on the rotor or casing. It is the purpose of the present invention to provide novel means for preventing objectionable pressure build-up in the casing port as the rotor is moving to the port closing position, thereby to minimize the wire drawing effect referred to and assure against the sealing ring means being thus sucked out of its mounting groove and into the passing rotor flow passage.

Therefore, it is an object of the present invention to provide the rotor with a bleed passage so placed as to maintain communication between the casing port and the rotor flow passage as said flow passage approaches and attains the out-of-registry position with respect to the casing port, thereby to relieve pressure in said port and prevent pressure build up therein sufficient to provide an orificing effect such as will suck the sealing ring means out of its mounting groove as a result of high velocity passage of fluid through the small, ever diminishing space communicating between the port and flow passage as the rotor moves to said out-of-registry position.

Another object of the invention is to provide in a valve assembly of the character stated and wherein are included a plurality of port sealing rings, a rotor flow passage communicating bleed passage at each side of the rotor flow passage, said bleed passages being located so that when the rotor is in casing port and rotor flow passage aligning positions, the bleed passages are disposed at opposite sides of a given sealing ring and between said sealing ring and the next adjacent sealing ring so as not to interfere with complete closing off of a port or ports selected to be closed off.

With the above and other objects in view that will hereinafter appear, the nature of the invention will be more clearly understood by reference to the following detailed description, the appended claims, and the several views illustrated in the accompanying drawings.

In the drawings:

Figure 3 is a horizontal section taken on the line 3—3 on Figure 2, the rotor being turned to a position in which the flow passage therein is in registry with one of the casing ports.

Figure 4 is a fragmentary horizontal section illustrating the rotor as turned away from the port and passage registry position shown in Figure 3 and almost, but not quite to a position for closing off the port.

Figure 5 is a face view of one of the sealing ring followers.

Figure 6 is an edge view of the follower shown in Figure 5.

Figure 7 is a somewhat diagrammatic, enlarged fragmentary sectional view illustrating how the orificing effect of fluid pressure flow tends to suck the sealing ring out of its mounting groove as the rotor approaches the port closing position.

Figure 8 is a view similar to Figure 7 illustrating how sealing rings are pinched as a result of being sucked out of their mounting grooves as the rotor approaches the port closing position.

Figure 1:
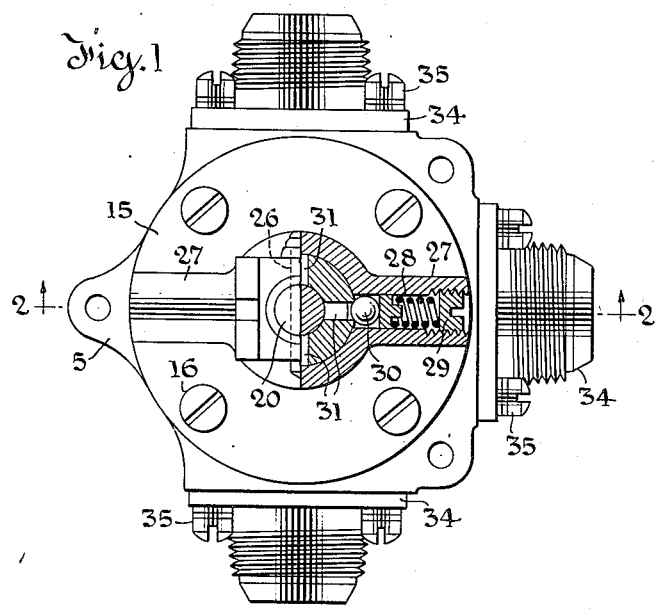
Figure 1 is a plan view of a valve structure embodying the invention, parts being broken away and in section.

In the disclosure herein presented exemplifying the invention, the novel features are shown as incorporated in a valve in which the casing has three inlet or delivery ports arranged in a common horizontal plane and a single downwardly directed inlet or outlet port, and the rotor has an elbow flow passage turnable into registry with a selected one of the group of three ports for bringing about flow communication between the selected one of the three ports and the downwardly directed port, or the rotor can be turned to close off communication with all three of the horizontally disposed ports.

In the form of the invention herein disclosed the valve structure includes a casing 5 having three radially disposed bores 6 all arranged in a common horizontal plane. Each of the bores 6 opens into a large cylindriform rotor bore 7, and each end of the rotor bore is chamfered as at 8 to provide a seat for a sealing ring 9. The sealing ring at the bottom of the valve surrounds a boss 10 extending from a closure cap 11 which is screw secured as at 12 to said casing and which holds the ring in tight sealing contact with its seat. The cap 11 is equipped with a central inlet or discharge port 13.

The sealing ring or gasket 9 at the top of the valve surrounds a boss 14 extending from a closure cap 15 which is screw secured as at 16 to the casing, and the boss 14, like the previously mentioned cap boss 10, extends into the respective end of the rotor bore 7.

Figure 2:
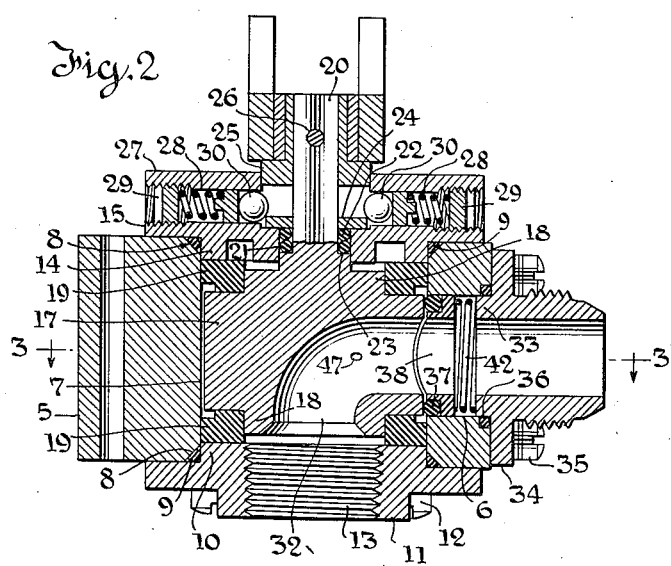
Figure 2 is a vertical cross section taken on the line 2—2 on Figure 1.

A valve rotor 17 is freely rotatably mounted in the rotor bore 7 and is equipped with bearing hubs 18 at the respective ends thereof which are rotatably received in non-metallic bearing rings 19 mounted in the casing in a manner clearly illustrated in Figure 2. The rotor includes a reduced diameter stem extension 20 which passes through a center bore 21 in the cap 15 wherein it is surrounded by packing rings 22 disposed between the stem shoulder 23 and an abutment ring 24 surrounding the same in spaced relation to said shoulder.

The cap 15 also has a counterbore within which is received the collar 25 which is pin secured as at 26 upon the end of the rotor stem which extends out of the casing. The cap 15 also is equipped with a raised rib 27 having a longitudinal bore 28 therethrough in each end of which is threadably mounted an abutment screw 29 and a spring pressed ball or detent 30. Each ball or detent 30 is engageable in a recess 31 formed in the external surface of the collar 25, four such recesses being provided in equidistantly spaced relation. The spring pressed elements 30 serve to yieldably hold the rotor in selected positions or stations disposed in ninety degree spaced relation about the rotor center.

The rotor 17 is provided with an elbow flow passage 32 which constantly communicates with the casing bottom port 13 at one end and has its other end presented for selective communication with the several casing ports 6. The yieldable detent and recess equipments 30, 31 will yieldably retain the rotor in the off position in which its flow passage 32 will be out of communication with all of the casing ports, or it will be yieldably held in position for registering with any selected one of the casing ports in the manner clearly illustrated in Figures 2 and 3 of the drawings.

Into the outer end of each casing bore 6 is fitted the positioning boss 33 of a port adapter 34 which is screw secured as at 35 to the casing. See Figure 1. A sealing gasket 36 is interposed between each adapter and the casing in the manner illustrated in Figures 2 and 3.

In each casing bore 6 is mounted a sealing ring 37, each said ring being disposed in a mounting groove defined at its outer face by the inner wall of the respective casing bore 6, and at its bottom and inner faces by the follower ring 38 mounted in the respective casing port. It will be observed by reference to Figures 2, 3, 5 and 6 of the drawings that each ring 38 is provided with an extension sleeve portion 39 forming the inner wall of the respective sealing ring mounting groove, and the groove bottom forming wall of the ring and the inner edge of the sleeve extension 39 are arcuately shaped as at 40 and 41 respectively to conform to the curvature of the periphery of the rotor 17. A compression spring 42 disposed between each follower ring 38 and the adjacent adapter end serves to urge the ring toward the rotor 17 and yieldably press the sealing ring 37 in sealing contact with the external surface thereof.

As the rotor is turned toward a port closing position in the manner illustrated in Figure 7 the trailing edge portion of the rotor flow passage 32 gradually closes the respective casing port, and a restricted passage or orifice 43 is formed between the rounded trailing edge portion 44 of the rotor flow passage just prior to attainment by the rotor of the port closing position. This restriction of the flow communication between the casing port and the rotor flow passage naturally causes building up of pressure in the casing port, and fluid passing through the orifice 43 at high velocity acts in a sort of wire drawing fashion to suck the sealing ring 37 out of its mounting groove in the direction indicated by the arrow 45 in Figure 7, thus causing the trailing edge portion 44 of the rotor flow passage 32 to engage and pinch the sealing ring in the manner indicated at 46 in Figure 8. Obviously frequent pinching of the sealing ring in this manner, if not prevented, would ultimately cause destruction of the sealing effect of the ring. This sucking of the sealing ring out of its mounting groove and pinching thereof by the rotor as it turns past the port closing position is prevented by provision of novel means which will now be described.

Bleed ports 47 and 48 are provided in the rotor, one thereof being disposed at each side of the flow passage 32 therein in the manner clearly illustrated in Figures 2, 3 and 4 of the drawings. Each port 47 or 48 extends into the rotor flow passage 32 and through the periphery of the rotor. These ports preferably, but not necessarily, are in the form of straight through bores extending radially inwardly through the periphery of the rotor into the rotor flow passage in the manner best illustrated in Figures 3 and 4. At their outer extremities the ports 47 and 48 are so spaced that when the rotor flow passage is turned to register with a selected one of the casing ports 6 they will open into the casing outwardly of an aligned sealing ring 37, and each thereof will be disposed between sealing rings so as not to interfere with complete closing off of any of the ports. It will be apparent by reference to Figure 3 that in the example of the embodiment of the invention herein disclosed the ports 47 and 48 are spaced apart 90°, as are the casing ports 6.

As before stated, without the provision of bleed ports of the nature of the ports 47, 48 fluid pressure would build up in the selected casing port 6, and the velocity of the fluid through the orifice 43 would tend to suck the aligned sealing ring 37 out of its mounting groove and into the rotor flow passage 32 so as to bring about a pinching of the ring in the manner illustrated in Figure 8. In a valve structure including the bleed ports 47, 48 the pressure builds up in the selected casing port 6 as the restricted passage or orifice 43 gradually diminishes in size during the closing off of the port, but because of said bleed ports this built up pressure is relieved to such an extent that no detrimental effects will result from any orificing of pressure fluid through the restricted passage 43, and sucking of the sealing ring out of its mounting groove will be avoided. The manner in which the bleed ports 47, 48 avoid objectionable pressure build up in the selected casing port is clearly illustrated in Figure 4. By increasing the size of the bleed ports 47 and 48 the tendency of pressure to build up in the selected casing port 6 will be diminished accordingly. However, there is a limit to the beneficially effective size of the bleed ports 47 and 48 since, for when said ports are made too large, a second orificing action will be brought about when the bleed port approaches the cut-off position. However, it has been found that a bleed port as large as $\tfrac{3}{16}$ of an inch may be used in a valve of the size herein disclosed without danger of the bleed port itself operating to pinch the sealing rings.

While one form of the invention has been shown for purpose of illustration, it is to be clearly understood that various changes in the details of construction and arrangement of parts may be made without departing from the spirit and scope of the invention as defined in the appended claims.

I claim:

1. In a valve structure, a casing having at least one port therein, a rotor having a flow passage therethrough and turnable for permitting or preventing flow of fluid through said port and passage, said casing having an annular groove therein surrounding said port, and a sealing ring of yieldable material mounted in and extending from said groove in sealing contact with the external surface of said rotor, said rotor having a port therein extending into the rotor flow passage and through the periphery of the rotor and disposed to maintain flow communication between the casing port and the rotor flow passage as the trailing edge portion of the rotor flow passage approaches the casing port cut-off position during movement of the rotor to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning.

2. In a valve structure, a casing having at least one port therein, a rotor having a flow passage therethrough and turnable clockwise or counterclockwise for permitting or preventing flow of fluid through said port and passage, said casing having an annular groove therein surrounding said port, and a sealing ring of yieldable material mounted in and extending from said groove in sealing contact with the external surface of said rotor, said rotor having a port therein at each side of the flow passage in the direction of rotation of the rotor, each said rotor port being disposed to maintain flow communication between the casing port and the rotor flow passage as the trailing edge portion of the rotor flow passage approaches the casing port cut-off position during movement of the rotor in one direction or the other to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning.

3. In a valve structure, a casing having a multiple of ports arranged in a common plane and spaced 90° apart, a rotor having a flow passage therethrough and turnable for permitting or preventing flow of fluid through said passage and a selected port, said casing having an annular groove therein surrounding each port, and a sealing ring of yieldable material mounted in and extending from said groove in sealing contact with the external surface of the rotor, said rotor also having a bleed port therein at each side of the rotor flow passage extending into said flow passage at its inner end and through the periphery of the rotor at its outer end spaced a distance from the center of the flow passage at the periphery of the rotor greater than the diameter of the sealing ring and in position to maintain flow communication between a selected casing port and the rotor flow passage as the trailing edge portion of the rotor flow passage approaches the casing port cut-off position during movement of the rotor to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning.

4. In a valve structure, a casing having at least one port therein, a rotor having a flow passage therethrough and turnable for permitting or preventing flow of fluid through said port and passage, said casing having an annular groove therein surrounding said port, and a sealing ring of yieldable material mounted in and extending from said groove in sealing contact with the external surface of said rotor, said rotor having a port therein extending into the rotor flow passage and through the periphery of the rotor and disposed to maintain flow communication between the casing port and the rotor flow passage as the trailing edge portion of the rotor flow passage approaches the casing port cut-off position during movement of the rotor to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning, said rotor port comprising a straight through bore extending into the flow passage in the rotor and outwardly in angular relation to said flow passage and through the periphery of the rotor to one side of its flow passage.

5. In a valve structure, a casing having at least one port therein, a rotor having a flow passage therethrough and turnable clockwise or counterclockwise for permitting or preventing flow of fluid through said port and passage, said casing having an annular groove therein surrounding said port, and a sealing ring of yieldable material mounted in and extending from said groove in sealing contact with the external surface of said rotor, said rotor having a port therein at each side of the flow passage in the direction of rotation of the rotor, each said rotor port being disposed to maintain flow communication between the casing port and the rotor flow passage as the trailing edge portion of the rotor flow passage approaches the casing port cut-off position during movement of the rotor in one direction or the other to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning, each said rotor port comprising a straight through bore extending into the flow passage in the rotor and outwardly in angular relation to said flow passage and through the periphery of the rotor to one side of its flow passage.

6. In a valve structure, a casing having at least one port therein, a rotor having a flow passage therethrough and turnable for permitting or preventing flow of fluid through said port and passage, said casing having an annular groove therein surrounding said port, and a sealing ring of yieldable material mounted in and extending from said groove in sealing contact with the external surface of said rotor, said rotor having a port therein extending into the rotor flow passage and through the periphery of the rotor and disposed to maintain flow communication between the casing port and the rotor flow passage as the trailing edge portion of the rotor flow passage approaches the casing port cut-off position during movement of the rotor to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning, the portion of the rotor port extending through the periphery of the rotor being spaced from the center of the rotor flow passage at the periphery of the rotor a distance greater than the outside diameter of the sealing ring.

7. In a valve structure, a casing having at least one port therein, a rotor having a flow passage therethrough and turnable clockwise or counterclockwise for permitting or preventing flow of fluid through said port and passage, said casing having an annular groove therein surrounding said port, and a sealing ring of yieldable material mounted in and extending from said groove in sealing contact with the external surface of said rotor, said rotor having a port therein at each side of the flow passage in the direction of rotation of the rotor, each said rotor port being disposed to maintain flow communication between the casing port and the rotor flow passage as the trailing edge portion of the rotor flow passage approaches the casing port cut-off position during movement of the rotor in one direction or the other to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning, the portion of each rotor port extending through the periphery of the rotor being spaced from the center of the rotor flow passage at the periphery of the rotor a distance greater than the outside diameter of the sealing ring.

8. In a valve structure, a casing having a multiple of ports arranged in a common plane and spaced 90° apart, a rotor having a flow passage therethrough and turnable for permitting or preventing flow of fluid through said passage and a selected port, said casing having an annular groove therein surrounding each port, and a sealing ring of yieldable material mounted in and extending from said groove in sealing contact with the external surface of the rotor, said rotor also having a bleed port therein at each side of the rotor flow passage extending into said flow passage at its inner end and through the periphery of the rotor at its outer end spaced a distance from the center of the flow passage at the periphery of the rotor greater than the diameter of the sealing ring and in position to maintain flow communication between a selected casing port and the rotor flow passage as the trailing edge portion of the rotor flow passage approaches the casing port cut-off position during movement of the rotor to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning, said bleed ports being spaced like distances at opposite sides of the rotor flow passage and 45° therefrom and constituting straight through bores arranged radially with respect to the rotor axis.

9. In a valve structure, a casing element having at least one port therein, a rotor element having a flow passage therethrough and turnable to present said passage in registering relation with said port for permitting flow through said port and passage or out of registering relation with said port for preventing such flow, one said element having an annular clearance therein disposed to surround the port when said port and passage are in registering relation, and a sealing ring of yieldable material mounted in and extending from said clearance for engaging in sealing contact between said elements, said rotor element having a port therein extending into its flow passage and through its periphery in position for maintaining flow communication between the casing element port and said flow passage as the trailing edge portion of said flow passage approaches a casing element port cut-off position.

JOSEPH F. MELICHAR.